US011632327B2

(12) United States Patent
Kolar et al.

(10) Patent No.: US 11,632,327 B2
(45) Date of Patent: Apr. 18, 2023

(54) ESTIMATING THE EFFICACY OF PREDICTIVE ROUTING FOR PROSPECTIVE DEPLOYMENTS

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/332,250

(22) Filed: May 27, 2021

(65) Prior Publication Data

US 2022/0385569 A1 Dec. 1, 2022

(51) Int. Cl.
*H04L 45/28* (2022.01)
*H04L 45/12* (2022.01)
*G06N 20/00* (2019.01)
*H04L 45/02* (2022.01)
*G06K 9/62* (2022.01)

(52) U.S. Cl.
CPC ............ *H04L 45/28* (2013.01); *G06K 9/6256* (2013.01); *G06N 20/00* (2019.01); *H04L 45/02* (2013.01); *H04L 45/08* (2013.01); *H04L 45/126* (2013.01)

(58) Field of Classification Search
CPC ...... G06K 9/6256; G06N 20/00; H04L 45/02; H04L 45/08; H04L 45/126; H04L 45/28
See application file for complete search history.

(56) References Cited

U.S. PATENT DOCUMENTS

| | | | |
|---|---|---|---|
| 9,929,949 B2 | 3/2018 | Mahadevan et al. | |
| 10,062,036 B2 | 8/2018 | Mermoud et al. | |
| 10,083,026 B1* | 9/2018 | Venkata | H04L 41/082 |
| 10,454,780 B2 | 10/2019 | Jeuk et al. | |
| 10,700,982 B2* | 6/2020 | Bajaj | H04L 41/5022 |
| 10,963,330 B2* | 3/2021 | Ungar | G06F 11/34 |
| 11,032,150 B2* | 6/2021 | Ma | H04L 41/12 |
| 11,323,312 B1* | 5/2022 | Banka | H04L 43/0829 |
| 2005/0223088 A1* | 10/2005 | Gerstel | H04L 41/145 |
| | | | 709/223 |
| 2008/0059637 A1* | 3/2008 | Gerstel | H04L 41/08 |
| | | | 709/226 |
| 2018/0242178 A1* | 8/2018 | Barton | H04W 24/08 |
| 2018/0309636 A1* | 10/2018 | Strom | H04L 45/02 |

(Continued)

*Primary Examiner* — George C Neurauter, Jr.
(74) *Attorney, Agent, or Firm* — Behmke Innovation Group LLC; Kenneth J. Heywood; Jonathon P. Western

(57) ABSTRACT

In one embodiment, a device obtains metadata for routing decisions made by a predictive routing service for a plurality of network deployments. The device identifies a network topology for a network deployment that does not use the predictive routing service. The device estimates, based on the metadata for routing decisions made by the predictive routing service, performance metrics for the predictive routing service were it to be used to make routing decisions for the network topology. The device sends, to a user interface, report data indicative of the performance metrics estimated for the predictive routing service were it to be used to make routing decisions for the network topology.

20 Claims, 9 Drawing Sheets

(56) References Cited

U.S. PATENT DOCUMENTS

2018/0343177 A1\* 11/2018 Fazlyab ................ H04L 41/147
2018/0359172 A1    12/2018 Yadav
2020/0252324 A1     8/2020 Sanchez Charles et al.
2020/0342346 A1\* 10/2020 Wulff ................... H04L 41/147

\* cited by examiner

ESTIMATING THE EFFICACY OF PREDICTIVE ROUTING FOR PROSPECTIVE DEPLOYMENTS

TECHNICAL FIELD

The present disclosure relates generally to computer networks, and, more particularly, to estimating the efficacy of predictive routing for prospective deployments.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. However, many network operators are hesitant to employ the use of predictive routing in their networks, due to concerns about its efficacy. One naïve approach would be to enroll each prospective network, study its telemetry data for a length of time that is sufficient for the predictive routing model to learn the data patterns of that network, and then determine the effectiveness for that particular deployment. As would be appreciated, though, such an approach does not scale. First, this would require enrollment and ingestion of telemetry data for potentially thousands, or even millions, of different prospective deployments. Second, it is time-ineffective, as the amount of time needed before the system can learn the behavior of the prospective network may take longer than a network operator is willing to commit.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
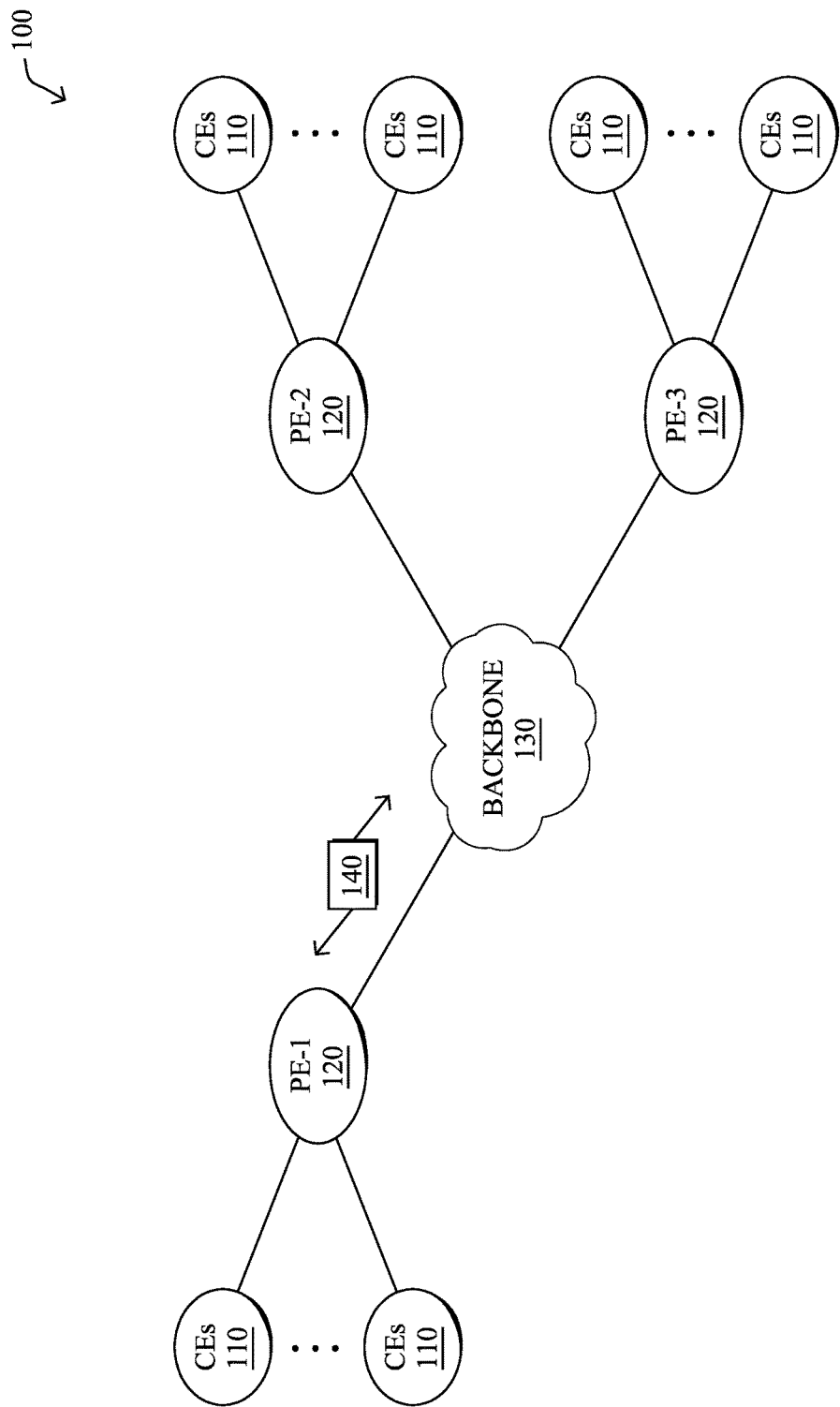
FIGS. 1A-1B illustrate an example communication network.

According to one or more embodiments of the disclosure, a device obtains metadata for routing decisions made by a predictive routing service for a plurality of network deployments. The device identifies a network topology for a network deployment that does not use the predictive routing service. The device estimates, based on the metadata for routing decisions made by the predictive routing service, performance metrics for the predictive routing service were it to be used to make routing decisions for the network topology. The device sends, to a user interface, report data indicative of the performance metrics estimated for the predictive routing service were it to be used to make routing decisions for the network topology.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by 602//router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
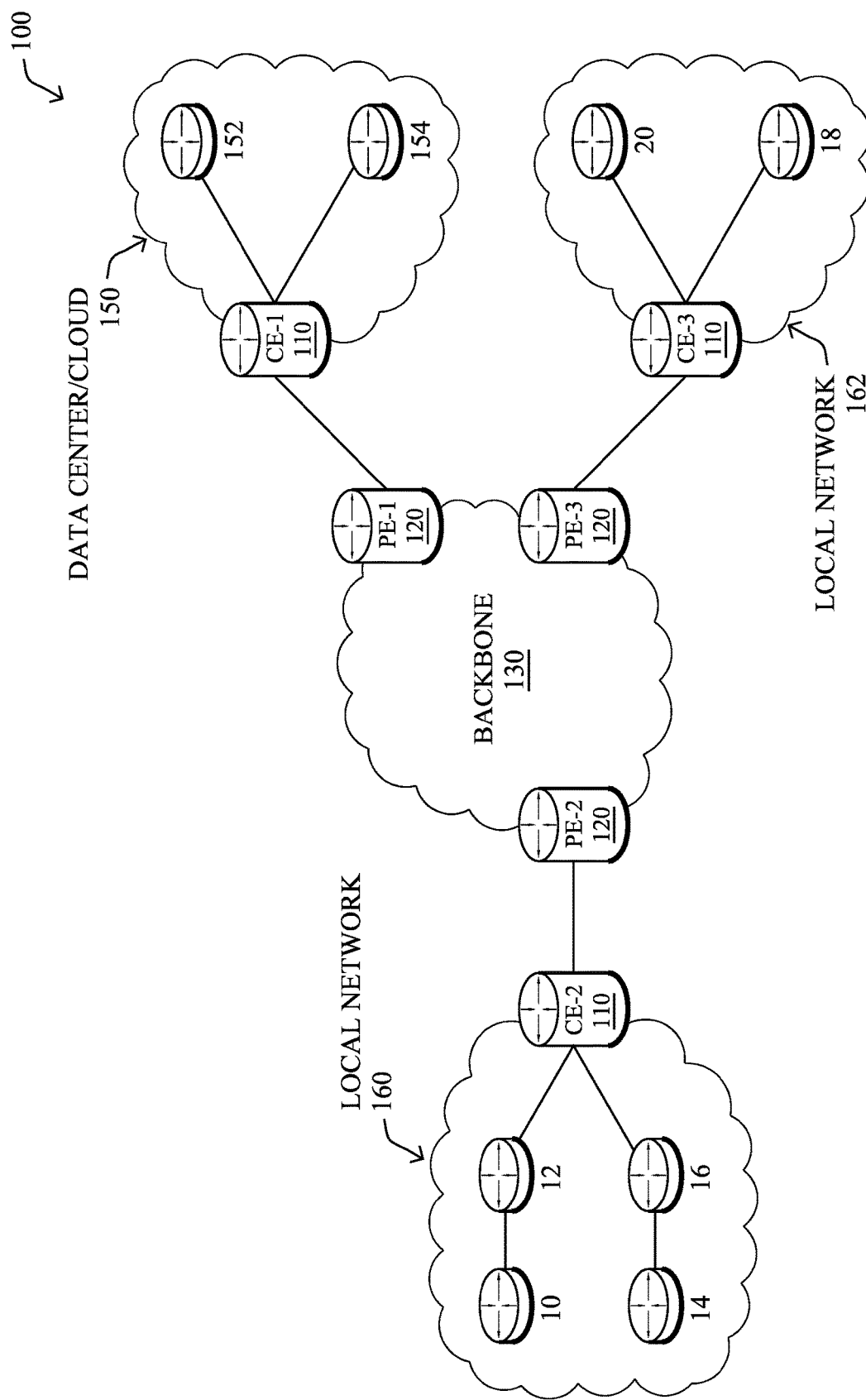

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
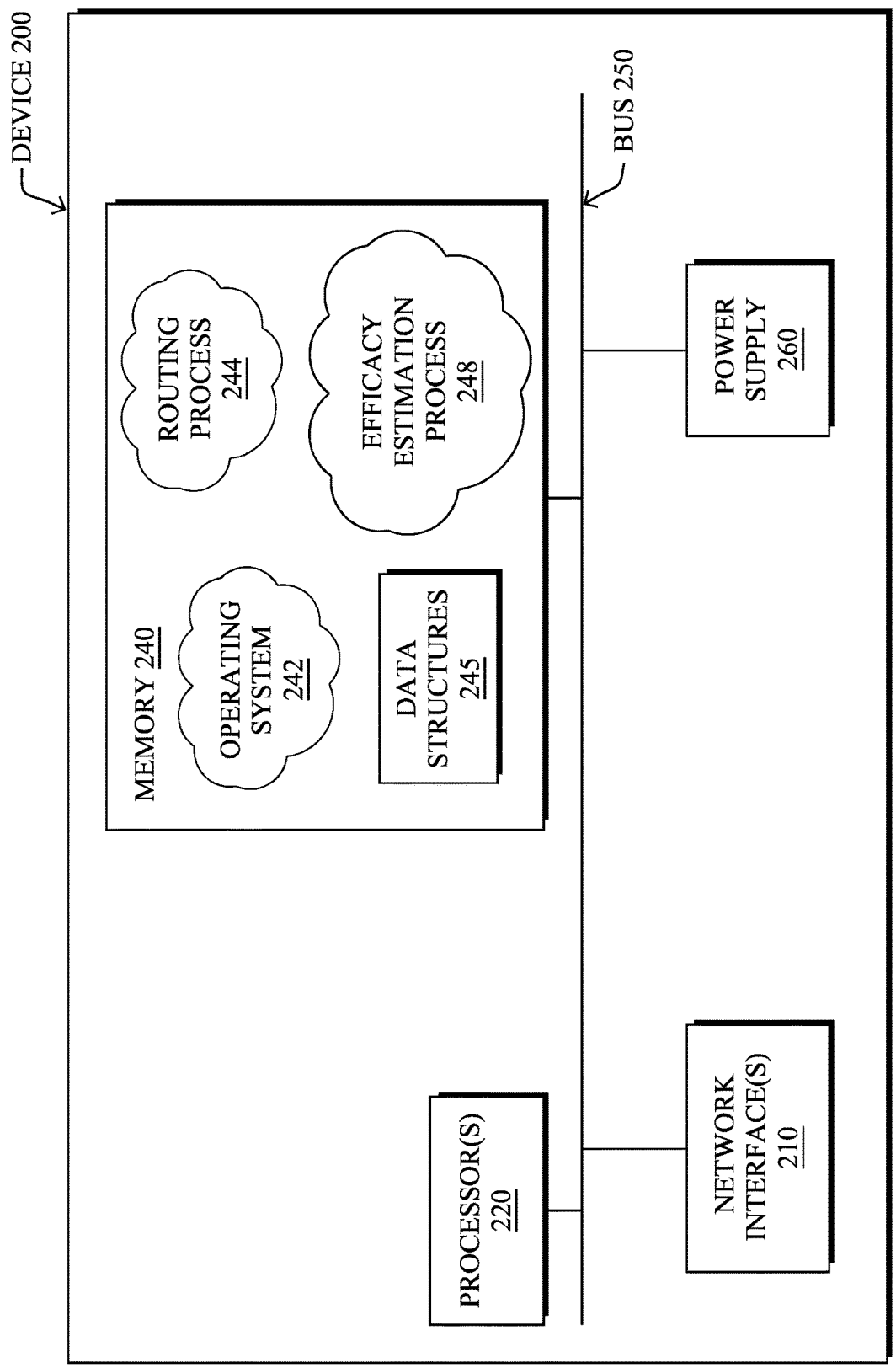
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a efficacy estimation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or efficacy estimation process 248 may also include computer executable instructions that, when executed by processor(s) 220, cause device 200 to perform the techniques described herein. To do so, in some embodiments, routing process 244 and/or efficacy estimation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or efficacy estimation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or efficacy estimation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
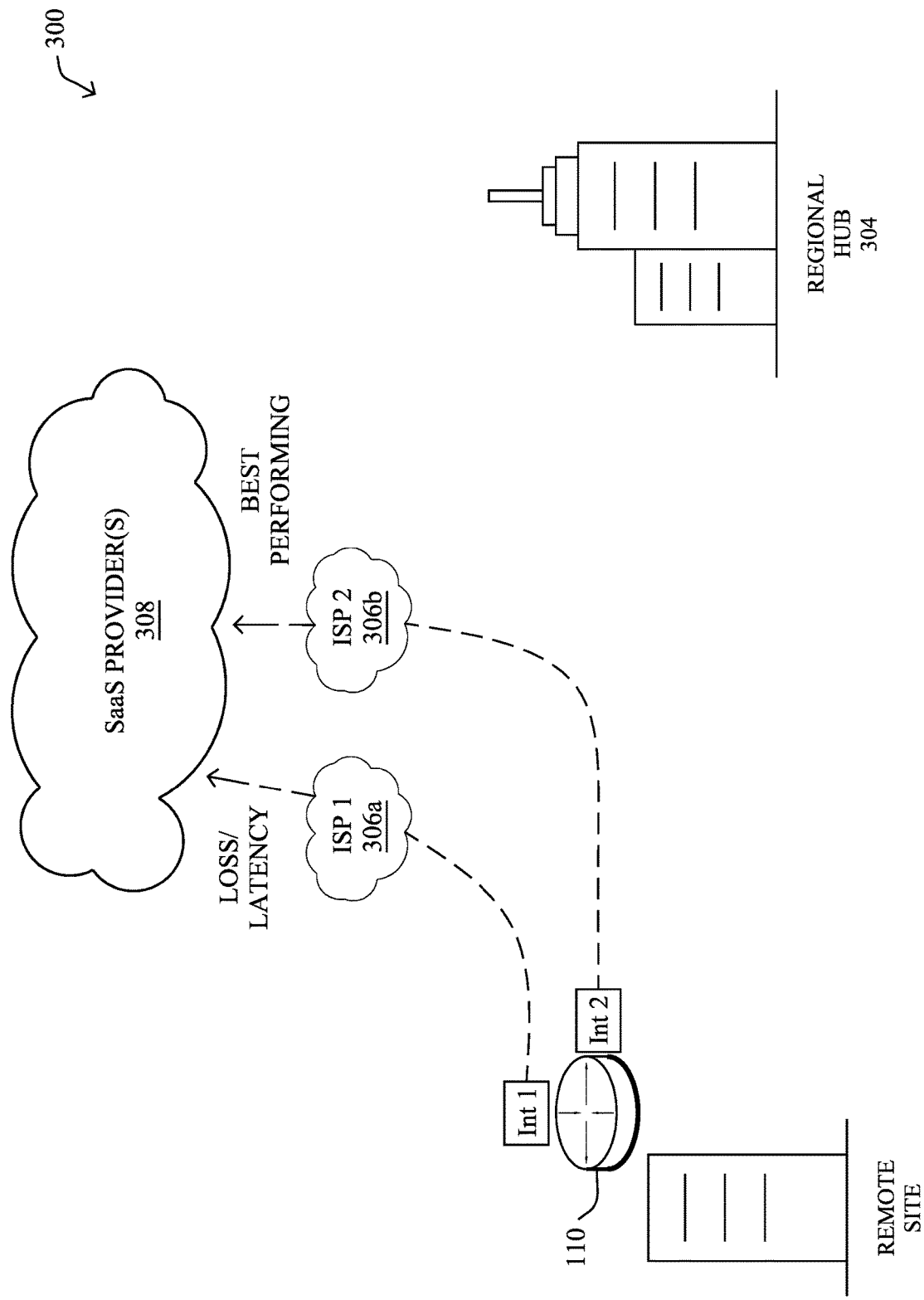
FIGS. 3A-3B illustrate example network deployments.
Figure 3B:
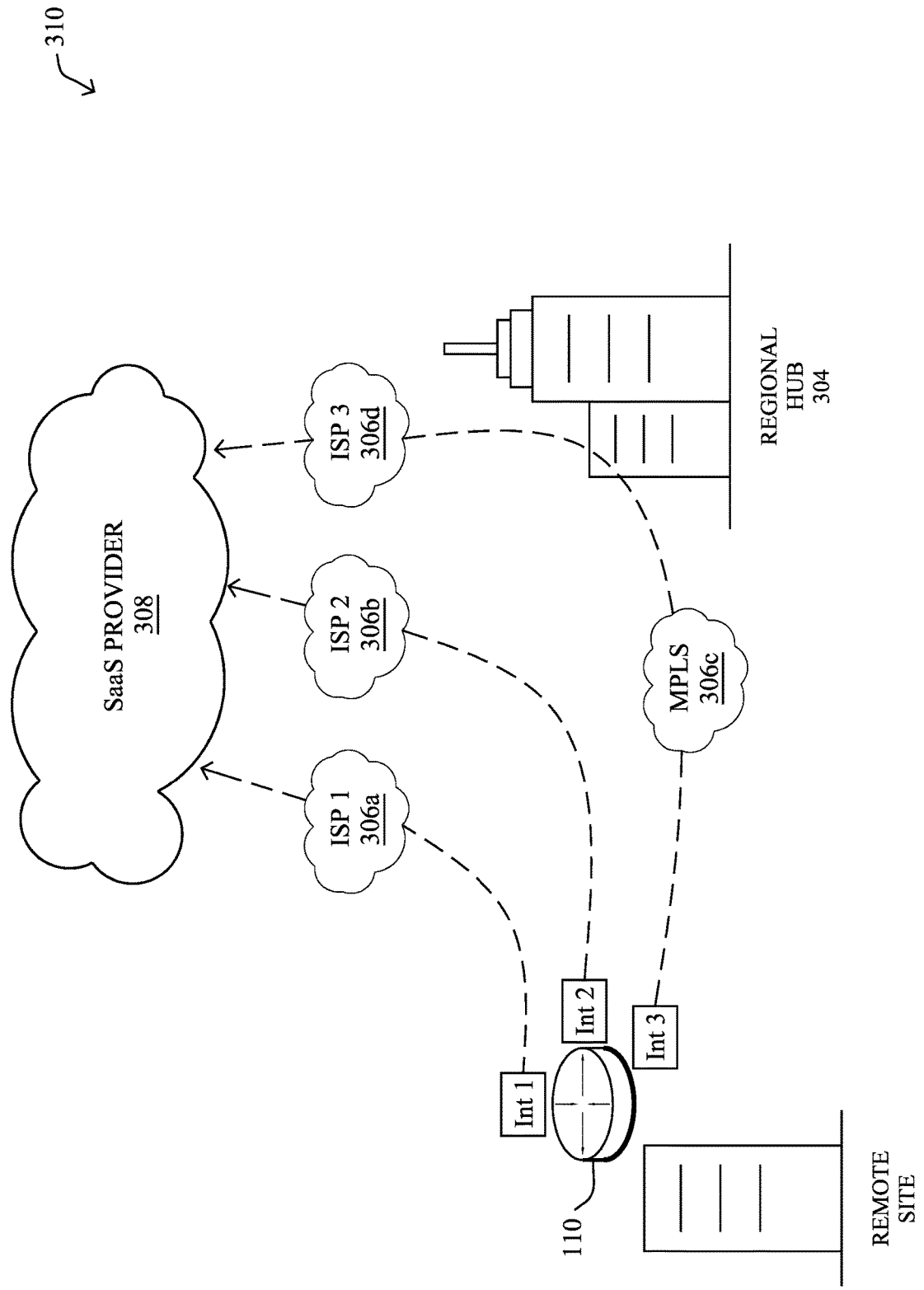

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
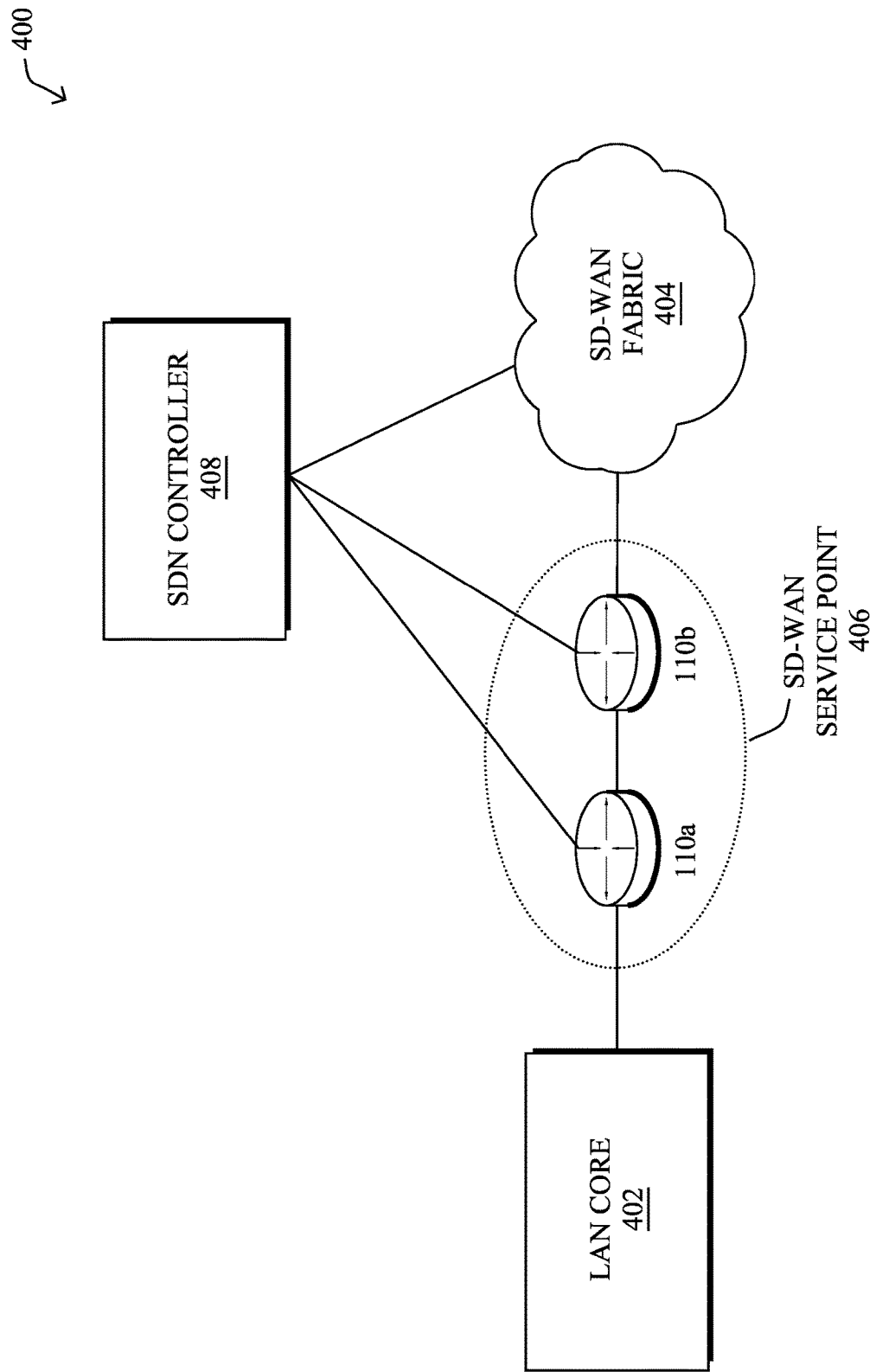
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Providers (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;

SaaS applications themselves being highly dynamic: it is common to see servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
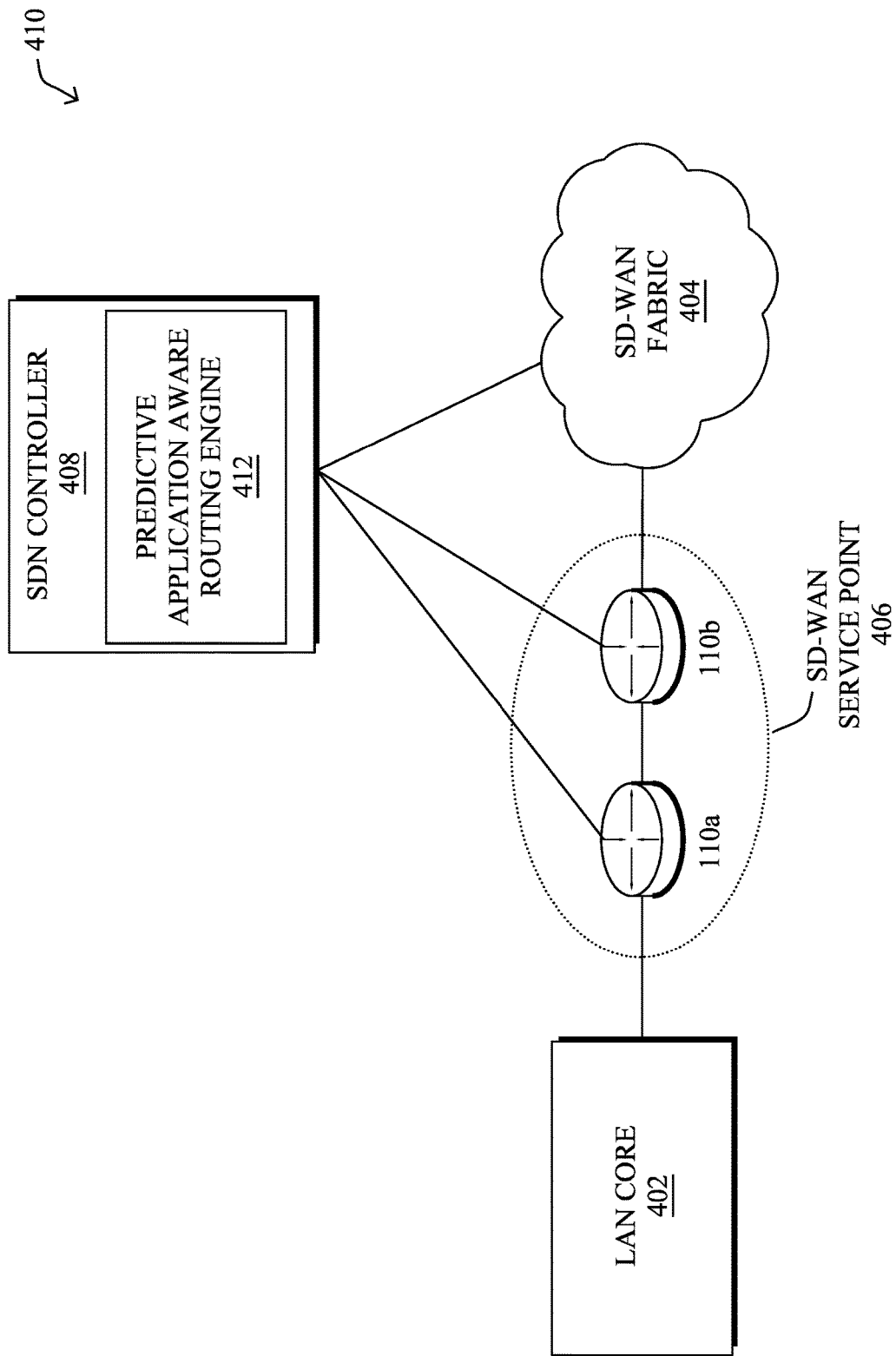

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or efficacy estimation process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, n the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which may be temporary in nature or may be made permanent.

As noted above, a predictive muting engine, such as predictive application aware routing engine 412, can help to protect a network against poor application experience across multiple sessions routed through suboptimal paths. However, many network operators are hesitant to employ the use of predictive routing in their networks, due to concerns about its efficacy. Indeed, before choosing to adopt the use of a predictive routing engine, a network operator may want an estimate of: a.) how much of the overall traffic is currently resulting in bad application experience, and b.) how much savings can be realized by the routing engine. For instance, the current bad application experience and savings can be quantified in terms of minutes, hours, or any other reasonable metric. Estimating such benefits can also help to identify network deployments that would benefit most from the predictive routing engine.

One naïve approach to estimating the efficacy of a predictive routing engine for a network to which it is not currently associated would be to first enroll each prospective network, then study its telemetry data for a length of time that is sufficient for the predictive routing model to learn the data patterns of that network and, finally, determine the effectiveness for that particular deployment. As would be appreciated, though, such an approach does not scale. First, this would require enrollment and ingestion of telemetry data for potentially thousands, or even millions, of different prospective deployments. Second, it is time-ineffective, as the amount of time needed before the system can learn the behavior of the prospective network may take longer than a network operator is willing to commit.

Estimating the Efficacy of Predictive Routing for Prospective Deployments

The techniques herein propose using data regarding the network(s) currently under control by a predictive routing engine, to predict the possible benefits of predictive routing for a network that is not currently using the predictive routing engine. In some aspects, effectiveness data may be gathered across a diverse set of existing networks/deployments, to learn the effectiveness of the model as a function of the metadata such as the number of paths, geo-location of paths, type of edge routers on the paths, and/or the underlying fabric (e.g., MPLS, LTE, etc.). The bad-experience and benefits may be quantified in terms of number of application sessions, number of session minutes, or even monetary cost, provided the bad-experience and benefit values can be mapped to some cost. In yet another aspect, the techniques herein introduce a reporting system that can provide an in-depth report of potential network deployments that could benefit the most by using the predictive routing system.

Illustratively, the techniques described herein may be performed by hardware, software, and/or firmware, such as in accordance with efficacy estimation process 248, which may include computer executable instructions executed by the processor 220 (or independent processor of interfaces 210) to perform functions relating to the techniques described herein (e.g., in conjunction with routing process 244).

Specifically, according to various embodiments, a device obtains metadata for routing decisions made by a predictive routing service for a plurality of network deployments. The device identifies a network topology for a network deployment that does not use the predictive routing service. The device estimates, based on the metadata for routing decisions made by the predictive routing service, performance metrics for the predictive routing service were it to be used to make routing decisions for the network topology. The device sends, to a user interface, report data indicative of the performance metrics estimated for the predictive routing service were it to be used to make routing decisions for the network topology.

Figure 5:
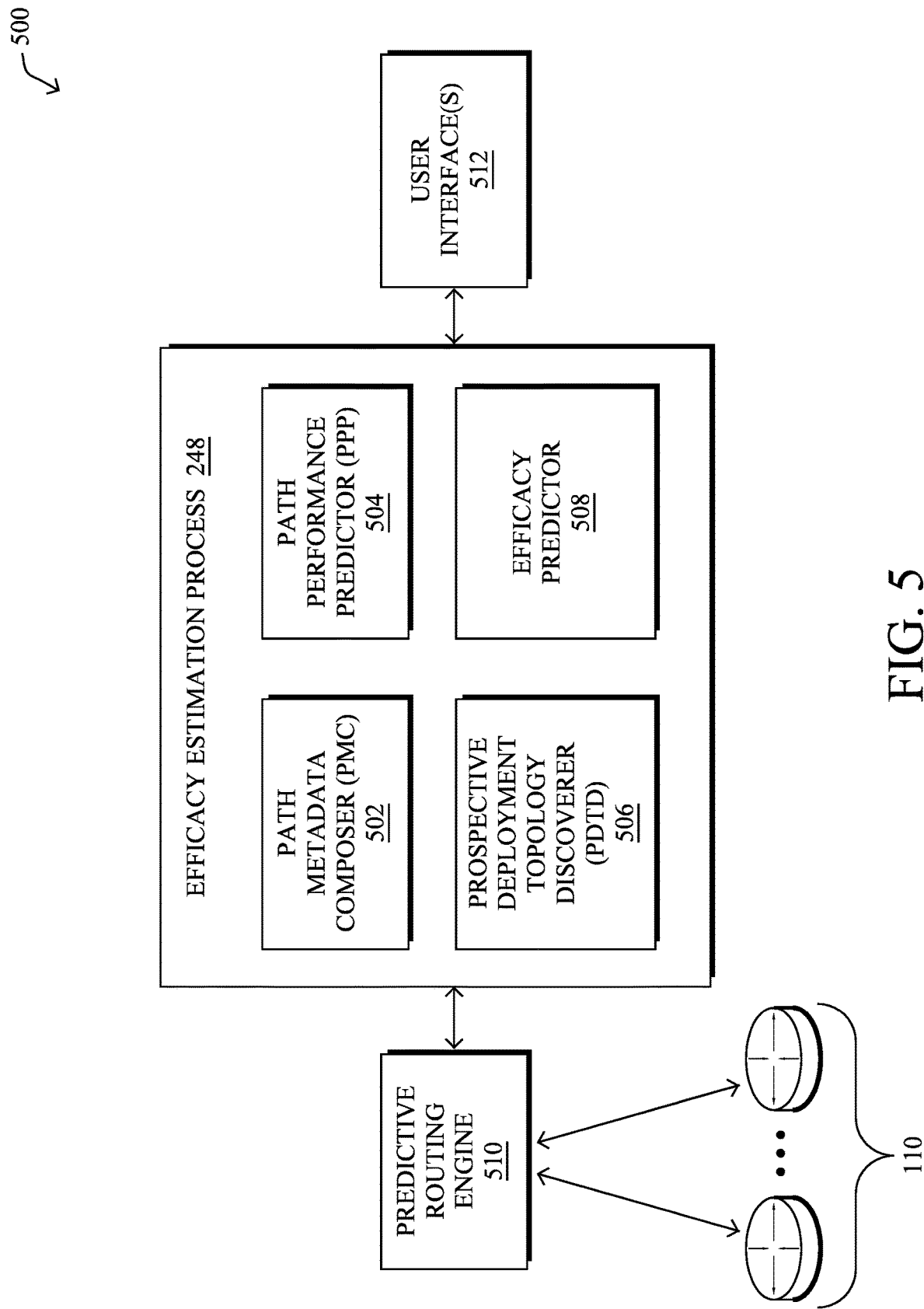
FIG. 5 illustrates an example architecture for evaluating the efficacy of a predictive routing system for a prospective deployment.

Operationally, FIG. 5 illustrates an example architecture 500 for evaluating the efficacy of a predictive routing system for a prospective deployment, according to various embodiments. At the core of architecture 500 is efficacy estimation process 248, which may be executed by a controller for a network or another device in communication therewith. For instance, efficacy estimation process 248 may be executed by a controller for a network (e.g., SDN controller 408 in FIGS. 4A-4B, such as part of predictive application aware routing engine 412), a particular networking device in the network (e.g., a router, etc.), another device or service in communication therewith, or the like.

As shown, architecture 500 may include any or all of the following components: a path metadata composer 502, a path performance predictor 504, a prospective deployment topology discoverer (PDTD) 506, and/or an efficacy predictor 508. As would be appreciated, the functionalities of these components may be combined or omitted, as desired. In addition, these components may be implemented on a singular device or in a distributed manner, in which case the combination of executing devices can be viewed as their own singular device for purposes of executing efficacy estimation process 248.

In various embodiments, efficacy estimation process 248 may operate in conjunction with a predictive routing engine 510, either as a component thereof or as a separate process. Predictive routing engine 510 may perform any or all of the previously described predictive routing functions, and potentially on an application-aware basis. To this end, predictive routing engine 510 may perform two key functions with respect to its associated network(s):

Network Data Collection: Here, predictive routing engine 510 may obtain the input data from the networks (e.g., from routers 110, etc.) that is needed to predict the optimal routing paths at any given time. Such data may include, for instance, any or all of the following: a.) metric data, which includes information about the path QoS metrics such as loss, latency and jitter, b.) flow data regarding the sessions of traffic of different applications that flow on the paths (e.g., NetFlow data, etc.), and c.) an optional application-experience data, which collects data about application experiences for sessions that were routed over the paths.

Forecasting and Control: Using the obtained network data, predictive routing engine 510 may forecast the path QoS or QoE and predict the best path for a given application at a given time.

In various embodiments, efficacy estimation process 248 may include path metadata composer (PMC) 502, which is responsible for collecting and merging the path data with other metadata of the path. The metadata is mainly tagged for each path, and the objective is to predict the savings and amount of bad-experience session minutes, given only the metadata, since the prospective deployment is not yet enrolled. The metadata will usually consist of tagging each path with any or all the following metadata and savings attributes:

Source and Destination. Geo-regions: This will describe the continent, country, region, city and, possibly, latitude/longitude of the edge-routers for source and destination. Note that based on this information metadata such as geo-distance of the path can also be computed.

Device Information: This will consist of device-model, version, and high-level system statistics such as total and available memory and number of cores.

Service Provider: The interface of a branch router will usually enter an. Internet Service Provider (SP). The SP of the source and destination interfaces of the path provide useful information about the quality of the path. This can be obtained via. IP geo-location databases such as ip2loc. Each IP address can also be mapped to the approximate geo-location of the SR Thus, the source and destination SP, SP-city, SP-country can also be tagged for a path.

Application Traffic Estimates: Long-term averages of the traffic that flows through the paths may also be recorded. This can be time-series of the number of sessions, session-minutes, and/or throughput used for each application.

Routing performance metrics: This consists of the metrics that describe the potential had session minutes and the savings achieved over a path.

Bad-experience metrics: Typically, a summary of the number of session minutes that lead to bad-experience metrics is already measured by performance evaluation of predictive routing engine 510. This data may be summarized, such as mean savings per path, or mean savings for each day of the week. In other embodiments, the bad-experience metrics may also be mapped on to a dollar value by associating the cost of having bad-experience by the user. For example, a disconnected session can be mapped to loss in productivity or the opportunity cost of realizing a profit.

Saving metrics: The number of minutes or other cost saved by predictive routing can also be computed since the performance evaluation engine will continuously monitor the path performance. Summary metrics for savings is also tagged for a path.

In various embodiments, efficacy estimation process 248 may also include path performance predictor (PPP) 504, which is responsible for predicting the savings and bad-experience metrics from the path metadata. This component takes as input the data collated by PMC 502 to predict routing performance metrics. It is usual to have correlation between the metadata and expected amount of routing performance.

For example, PPP 504 may identify those countries or other locations exhibiting bad-application session minutes, as well as the savings realized in those regions through use of predictive routing engine 510. PPP 504 may exploit such features to estimate the routing effectiveness.

In one embodiment, PPP 504 may construct a regression model to estimate each of the routing performance metrics (bad-experience metrics and savings). The features can be the metadata metrics of the path such as geo-regions, geo-distance of the path, and/or device-attributes (as obtained by PMC 502). In another embodiment, PPP 504 may provide confidence values (uncertainty estimates) along with the predicted estimate score for each path. In yet another embodiment, PPP 504 may also create models to predict not only per path, but also between a pair of source- and destination-aggregation units, such as source-destination country pairs, or source-destination device pairs.

In further embodiments, efficacy estimation process 248 may include prospective deployment topology discoverer (PDTD) 506. In general, this component may take the form of a cloud-based application which takes as input the network topology of the new prospective deployment that is not yet enrolled into the predictive routing system and will extract the metadata of the paths (metadata as explained in PMC). In one embodiment, PDTD 506 can take in a configuration file for a network. For example, Viptela network can be ingested by reading the device and device-configuration data stored in vManage. Similarly, for other networking technologies, a YANG model may be used to ingest the topology information. A manual topology tool may also be provided where network administrators can enter topology and path metadata via user interface(s) 512. This is useful for prospective deployments who have not yet opted into a specific networking technology that is already supported by predictive routing engine 510. This metadata is then stored in a database.

In various embodiments, efficacy estimation process 248 may further include efficacy predictor 508, which is responsible for predicting the efficacy of using predictive routing engine 510 to predictively route traffic for a new, prospective deployment. The metadata of the new prospective deployment is first collated and provided as features to the model which is trained by PPP 504. Efficacy predictor 508 will then infer the effectiveness of each path for the new prospective deployment. In turn, efficacy predictor 508 may compute metrics such as average savings per path directly from the predictions. The efficacy metrics can also be grouped different aggregation units such as per geo-region or per-site and provided to the prospective deployment for review via user interface(s) 512. In another embodiment, the report may provide uncertainty estimates (if the model of PPP 504 provides such estimates).

The PDTP 506 and efficacy predictor 508 reports can then be instantaneously used to predict the benefits of using predictive routing to the prospective deployment.

Figure 6:
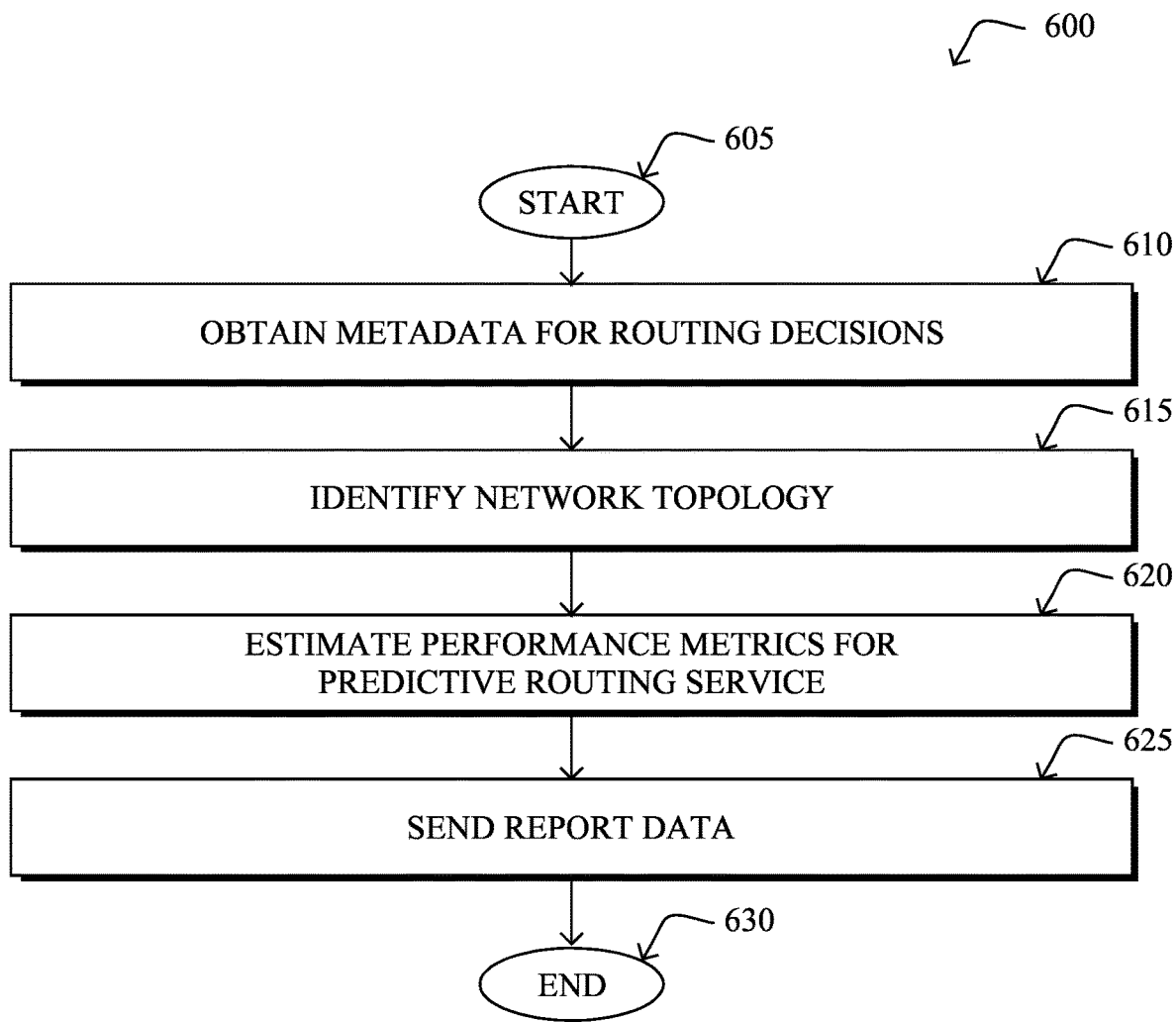
FIG. 6 illustrates an example simplified procedure for evaluating the efficacy of a predictive routing system for a prospective deployment.

FIG. 6 illustrates an example simplified procedure 600 for evaluating the efficacy of a predictive routing system for a prospective deployment, in accordance with one or more embodiments described herein. For example, a non-generic, specifically configured device (e.g., device 200), such as controller for a network (e.g., an SDN controller or other device in communication therewith, a networking device, etc.), may perform procedure 800 by executing stored instructions (e.g., routing process 244 and/or efficacy estimation process 248). The procedure 600 may start at step 605, and continues to step 810, where, as described in greater detail above, the device may obtain metadata for routing decisions made by a predictive routing service for a plurality of network deployments. In various embodiments, the metadata comprises geo-locations of sources and destinations of paths in the plurality of network deployments, application traffic estimates, the Internet service provider(s) used by the plurality of network deployments, etc. In further embodiments, the metadata may be indicative of an amount of time during which application experience metrics were degraded in the plurality of network deployments and/or an amount of savings that resulted from the routing decisions.

At step 615, as detailed above, the device may identify a network topology for a network deployment that does not use the predictive routing service. For instance, the device may receive the network topology via a user interface. In other instances, the device may receive the network topology via one or more configuration files, such as using YANG model or other suitable format.

At step 620, the device may estimate, based on the metadata for routing decisions made by the predictive routing service, performance metrics for the predictive routing service were it to be used to make routing decisions for the network topology, as described in greater detail above. For instance, the device may input metadata associated with the network topology to a prediction model that has been trained to estimate the performance metrics using a training dataset that comprises the metadata for the routing decisions made by the predictive routing service. Such a model may be a machine learning model, such as a regression model or the like. In various embodiments, the estimated performance metrics may correspond to an estimated amount of savings or a projected effect on application experience, should the prospective network deployment begin relying on the predictive routing service to make its routing decisions.

At step 625, as detailed above, the device may send, to a user interface, report data indicative of the performance metrics estimated for the predictive routing service were it to be used to make routing decisions for the network topology. In general, the report may allow a network operator of the prospective network deployment to assess how use of the predictive routing service will affect operation of their network. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the estimation of how efficient a predictive routing service will be for a prospective network deployment. In contrast to approaches that simply apply the predictive routing service to data from the prospective network deployment, the techniques herein propose leveraging metadata and data from existing network deployments that already use the service, to predict how well the service will perform for the prospective network. For instance, if the prospective network deployment uses the same or similar Internet service providers (ISPs) as that of existing users of the service, or is located in geo-location(s) that overlap those of existing users, etc., the performance of the service for those existing users can be leveraged to estimate how the service will also perform for the prospective network deployment.

While there have been shown and described illustrative embodiments that provide for estimating the efficacy of predictive routing for prospective network deployments, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, metadata for routing decisions made by a predictive routing engine for a plurality of network deployments;
   identifying, by the device, a network topology for a network deployment that does not use the predictive routing engine;
   estimating, by the device and based on the metadata for routing decisions made by the predictive routing engine, performance metrics for the predictive routing engine were it to be used to make routing decisions for the network topology; and
   sending, by the device and to a user interface, report data indicative of the performance metrics estimated for the predictive routing engine were it to be used to make routing decisions for the network topology.

2. The method as in claim 1, wherein the metadata is indicative of an amount of time during which application experience metrics were degraded in the plurality of network deployments.

3. The method as in claim 1, wherein the metadata is indicative of an amount of savings that resulted from the routing decisions.

4. The method as in claim 1, wherein the metadata comprises geo-locations of sources and destinations of paths in the plurality of network deployments, and wherein the network topology overlaps one or more of the geo-locations.

5. The method as in claim 1, wherein estimating the performance metrics for the predictive routing engine comprises:
   inputting metadata associated with the network topology to a prediction model trained to estimate the performance metrics using a training dataset that comprises the metadata for the routing decisions made by the predictive routing engine.

6. The method as in claim 5, wherein the prediction model is a machine learning-based model.

7. The method as in claim 1, wherein the metadata is indicative of one or more Internet service providers (ISPs).

8. The method as in claim 1, wherein the predictive routing engine makes routing decisions on a per-application basis.

9. The method as in claim 1, wherein identifying the network topology for the network deployment that does not use the predictive routing service comprises:
   receiving the network topology via the user interface.

10. The method as in claim 1, wherein the network topology comprises a software-defined network (SDN).

11. An apparatus, comprising:
    one or more network interfaces;
    a processor coupled to the one or more network interfaces and configured to execute one or more processes; and
    a memory configured to store a process that is executable by the processor, the process when executed configured to:
       obtain metadata for routing decisions made by a predictive routing engine for a plurality of network deployments;
       identify a network topology for a network deployment that does not use the predictive routing engine;
       estimate, based on the metadata for routing decisions made by the predictive routing engine, performance metrics for the predictive routing engine were it to be used to make routing decisions for the network topology; and
       send, to a user interface, report data indicative of the performance metrics estimated for the predictive routing engine were it to be used to make routing decisions for the network topology.

12. The apparatus as in claim 11, wherein the metadata is indicative of an amount of time during which application experience metrics were degraded in the plurality of network deployments.

13. The apparatus as in claim 11, wherein the metadata is indicative of an amount of savings that resulted from the routing decisions.

14. The apparatus as in claim 11, wherein the metadata comprises geo-locations of sources and destinations of paths in the plurality of network deployments, and wherein the network topology overlaps one or more of the geo-locations.

15. The apparatus as in claim 11, wherein the apparatus estimates the performance metrics for the predictive routing engine by:
    inputting metadata associated with the network topology to a prediction model trained to estimate the performance metrics using a training dataset that comprises the metadata for the routing decisions made by the predictive routing engine.

16. The apparatus as in claim 15, wherein the prediction model is a machine learning-based model.

17. The apparatus as in claim 11, wherein the metadata comprises application traffic estimates.

18. The apparatus as in claim 11, wherein the predictive routing engine makes routing decisions on a per-application basis.

19. The apparatus as in claim 11, wherein the network topology comprises a software-defined network (SDN).

20. A tangible, non-transitory, computer-readable medium storing program instructions that cause a device to execute a process comprising:
    obtaining, by the device, metadata for routing decisions made by a predictive routing engine for a plurality of network deployments;
    identifying, by the device, a network topology for a network deployment that does not use the predictive routing engine;
    estimating, by the device, and based on the metadata for routing decisions made by the predictive routing engine, performance metrics for the predictive routing engine were it to be used to make routing decisions for the network topology; and sending, by the device and to a user interface, report data indicative of the performance metrics estimated for the predictive routing engine were it to be used to make routing decisions for the network topology.

* * * * *

UNITED STATES PATENT AND TRADEMARK OFFICE
CERTIFICATE OF CORRECTION

PATENT NO. : 11,632,327 B2
APPLICATION NO. : 17/332250
DATED : April 18, 2023
INVENTOR(S) : Vinay Kumar Kolar It is certified that error appears in the above-identified patent and that said Letters Patent is hereby corrected as shown below:

In the Specification

Column 9, Line 2, please amend as shown:
common to see new servers deployed in the network. DNS Column 10, Line 11, please amend as shown:
predicted SLA violation. For instance, in the case of video Column 10, Line 21, please amend as shown:
As noted above, a predictive routing engine, such as Column 12, Line 14, please amend as shown:
path with any or all of the following metadata and savings Column 12, Line 16, please amend as shown:
Source and Destination Geo-regions: This will describe Column 12, Line 25, please amend as shown:
usually enter an Internet Service Provider (SP). The SP Column 12, Line 28, please amend as shown:
path. This can be obtained via IP geo-location data- Column 12, Line 30, please amend as shown:
mapped to the approximate geo-location of the SP.

Column 12, Line 39, please amend as shown:
that describe the potential bad session minutes and the Signed and Sealed this
Eighteenth Day of July, 2023

Katherine Kelly Vidal
*Director of the United States Patent and Trademark Office*